United States Patent [19]

Cantatore

[11] Patent Number: 4,546,148

[45] Date of Patent: Oct. 8, 1985

[54] POLYMERIC COMPOUNDS, CONTAINING PIPERIDINE RADICALS, A PROCESS FOR THEIR PREPARATION, AND THEIR USE AS STABILIZERS FOR SYNTHETIC POLYMERS

[75] Inventor: Giuseppe Cantatore, Bitonto, Italy

[73] Assignee: Ciba-Geigy S.p.A., Origgio, Italy

[21] Appl. No.: 633,423

[22] Filed: Jul. 19, 1984

[30] Foreign Application Priority Data

Jul. 19, 1983 [IT] Italy .................... 22138 A/83

[51] Int. Cl.⁴ ............................................. C08L 75/00
[52] U.S. Cl. .................................... 525/186; 524/99; 524/583; 524/585; 525/187; 528/341; 546/186; 546/190; 546/191
[58] Field of Search ............ 524/99; 525/186, 187; 528/341; 546/190, 186, 191

[56] References Cited

U.S. PATENT DOCUMENTS 4,086,204  4/1978  Cassandrini et al. ............... 524/100
4,104,248  8/1978  Cantatore ............................ 525/529
4,233,412  11/1980  Rody et al. ......................... 525/425

*Primary Examiner*—Theodore E. Pertilla
*Attorney, Agent, or Firm*—Wenderoth, Lind & Ponack

[57] ABSTRACT

Novel polycondensed compounds containing piperidine groups of polycarbamate structure, of the general formula:

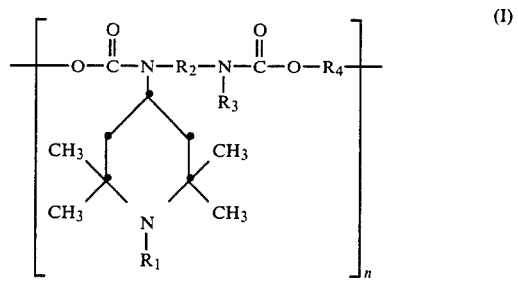

6 Claims, No Drawings

POLYMERIC COMPOUNDS, CONTAINING PIPERIDINE RADICALS, A PROCESS FOR THEIR PREPARATION, AND THEIR USE AS STABILIZERS FOR SYNTHETIC POLYMERS

The present invention relates to novel compounds containing piperidine groups which can be used as light stabilisers, heat stabilisers and oxidation stabilisers for synthetic polymers, and to the process for their preparation.

It is known that synthetic polymers undergo a progressive change in their physical properties, such as loss of their mechanical strength and colour changes, when they are exposed to sunlight or other sources of ultraviolet light.

In order to delay the negative effect of ultraviolet radiation on synthetic polymers, it has been proposed to use various stabilizers which protect against light.

Some of these products show a marked effectiveness in articles of large thickness, but in articles with extensive surface development, such as fibres, tapes and films, they are not advisable because of their tendency to volatilisation and to extraction by water, whether during the production process or during the use. For an effective light stabilisation of articles with extensive surface development it has been proposed to use products of polymeric nature which, because of their relatively high molecular weight are markedly resistant to volatilisation and extraction by water.

Some of these products show a remarkable efficacy as light stabilizers: in particular, U.S. Pat. No. 4,086,204 has claimed polytriazine compounds containing piperidine groups; U.S. Pat. No. 4,104,248 has claimed polyamides comprising piperidine groups; and U.S. Pat. No. 4,233,412 has claimed, polyester, polyamides, polyethers, polyurethanes, polysilylesters, polycarbonates comprising piperidine groups.

The results obtained with the abovementioned products were, however, not entirely satisfactory, so that a further improvement was desiderable. The present invention relates to novel products containing piperidine radicals, which have shown a surprising higher activity as light stabilizers for synthetic polymers, as compared with products of the state of the art."

In particular, the novel invention relates to polycarbamates of the general formula (I)

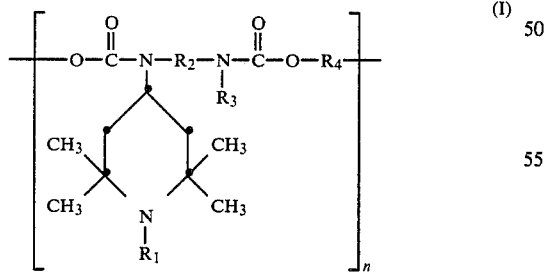

in which $R_1$ is hydrogen, O-, cyanomethyl, $C_1$-$C_{12}$-alkyl, $C_3$-$C_{12}$-alkenyl or -alkynyl, $C_7$-$C_{12}$-aralkyl, $C_1$-$C_{12}$-acyl, 2,3-epoxypropyl or

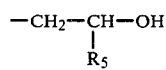

where $R_5$ is hydrogen, methyl, ethyl or phenyl, $R_2$ is $C_2$-$C_{12}$-alkylene, $C_4$-$C_{18}$-alkylene substituted by 1 or 2 oxygen or nitrogen atoms, $C_6$-$C_{12}$-cyclo-alkylene, $C_6$-$C_{12}$-arylene or $C_8$-$C_{12}$-aralkylene, $R_3$ is hydrogen, $C_1$-$C_{18}$-alkyl, $C_5$-$C_{18}$cycloalkyl, $C_6$-$C_{18}$-aryl, $C_7$-$C_{18}$-aralkyl or a radical of the formula (II)

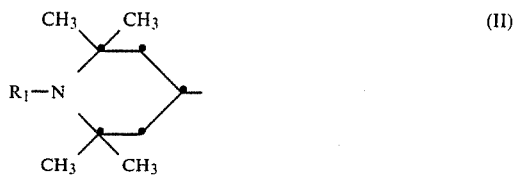

where $R_1$ is as defined above, $R_4$ is $C_2$-$C_{18}$-alkylene, $C_4$-$C_{12}$-alkylene substituted by 1 or 2 oxygen atoms, $C_6$-$C_{18}$-cycloalkylene, $C_6$-$C_{18}$-arylene, $C_8$-$C_{18}$-aralkylene or a radical of the formula (III) or (IV)

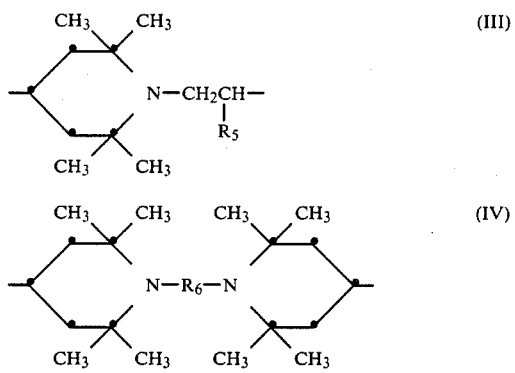

where $R_5$ is as defined above and $R_6$ is $C_2$-$C_{12}$-alkylene, $C_4$-$C_{12}$-alkenylene or $C_8$-$C_{12}$-aralkylene, and n is a number from 2 to 100.

Illustrative examples of the meanings of the various radicals in the formula (I) are:

for $R_1$: hydrogen, cyanomethyl, methyl, ethyl, propyl, butyl, hexyl, octyl, decyl, dodecyl, allyl, methallyl, but-2-enyl, hex-2-enyl, undec-10-enyl, propargyl, benzyl, methylbenzyl, t-butylbenzyl, hydroxybenzyl, acetyl, propionyl, butyryl, caproyl, benzoyl, 2,3-epoxypropyl, 2-hydroxyethyl and 2-hydroxypropyl;

for $R_2$: ethylene, 1,2-propylene, trimethylene, tetramethylene, pentamethylene, 2,2-dimethylpropane-1,3-diyl, hexamethylene, decamethylene, dodecamethylene, cyclohexylene, cyclohexylenedimethylene, phenylene, xylylene, 2-hydroxypropane-1,3-diyl, 3-oxapentane-1,5-diyl, 4-oxaheptane-1,7-diyl, 4,9-dioxadodecane-1,12-diyl and methyliminodipropylene;

for $R_3$: hydrogen, methyl, ethyl, propyl, isopropyl, butyl, but-2-yl, isobutyl, hexyl, 2-ethylhexyl, octyl, decyl, dodecyl, hexadecyl, octadecyl, cyclohexyl, methylcyclohexyl, trimethylcyclohexyl, cyclooctyl, phenyl, methylphenyl, dimethylphenyl, trimethylphenyl, t-butylphenyl, t-octylphenyl, methoxyphenyl, ethoxyphenyl, 3,5-di-t-butyl-4-hydroxyphenyl benzyl, methylbenzyl, hydroxybenzyl, 3,5-di-t-butyl-4-hydroxybenzyl, 2,2,6,6-tetramethyl-piperidin-4-yl, 1,2,2,6,6-pentamethyl-piperidin-4-yl, 1-allyl-2,2,6,6-tetramethyl-piperidin-4-yl, 1-benzyl-2,2,6,6-tetramethyl-piperidin-4-yl and 1-acetyl-2,2,6,6-tetramethyl-piperidin-4-yl;

for R₄: ethylene, 1,2-propylene, trimethylene, tetramethylene, 2,2-dimethylpropane-1,3-diyl, hexamethylene, decamethylene dodecamethylene, 3-oxapentane-1,5-diyl, cyclohexylene, cyclohexylenedimethylene, phenylene, xylylene or a radical of the formula (III) or (IV) where $R_5$ is hydrogen, methyl, ethyl, or phenyl and $R_6$ is ethylene, trimethylene, tetramethylene, hexamethylene, octamethylene, decamethylene, dodecamethylene, but-2-ene-1,4-diyl or xylylene.

Those compounds of the formula (I) are preferred in which $R_1$ is hydrogen, methyl, allyl, benzyl or acetyl, $R_2$ is $C_2$–$C_{12}$-alkylene, $R_3$ is $C_1$–$C_{12}$-alkyl, $C_5$–$C_{12}$-cycloalkyl or a radical of the formula (II) where $R_1$ is as defined above, $R_4$ is $C_2$–$C_{12}$-alkylene, 3-oxapentane-1,5-diyl, $C_6$–$C_{10}$-cycloalkylene or a radical of the formula (III) where $R_5$ is hydrogen, methyl or ethyl, or a radical of the formula (IV) where $R_6$ is $C_2$–$C_6$-alkylene, but-2-ene-1,4-diyl or xylylene, and n is a number from 2 to 50.

Those compounds of the formula (I) are particularly preferred in which $R_1$ is hydrogen or methyl, $R_2$ is $C_2$–$C_6$-alkylene, $R_3$ is $C_1$–$C_8$-alkyl, $C_6$–$C_9$-cycloalkyl, 2,2,6,6-tetramethyl-piperidin-4-yl or 1,2,2,6,6-pentamethyl-piperidin-4-yl, $R_4$ is $C_2$–$C_6$-alkylene, a radical of the formula (III) where $R_5$ is hydrogen or methyl, or a radical of the formula (IV) where $R_6$ is xylylene, an n is a number from 2 to 20.

The compounds of the formula (I) can be prepared by two processes.

According to the first process, a bis-carbamate of the formula (V)

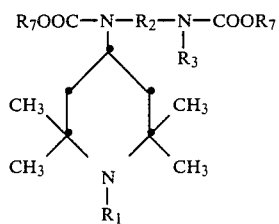

$$R_7OOC-N-R_2-N-COOR_7 \quad (V)$$

in which $R_7$ is $C_1$-$C_4$-alkyl and $R_1$, $R_2$ and $R_3$ are as defined above, is reacted, in the presence of a transesterification catalyst, with a diol of the formula (VI)

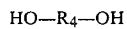

$$HO-R_4-OH \quad (VI)$$

in which $R_4$ is as defined above. The reaction can be carried out in the presence or absence of an inert organic solvent at a temperature between 100° and 280° C., preferably between 150° and 250° C., in a molar ratio of compound of formula (V): compound of formula (VI) between 1:1.5 and 1.5:1, preferably 1:1.

The catalysts used can be alkali metals or alcoholates, amides and hydrides of alkali metals.

According to the second process, the compounds of the formula (I) are prepared be reacting a compound of the formula (VIII)

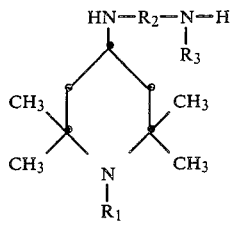

$$HN-R_2-N-H \quad (VII)$$

in which $R_1$, $R_2$ and $R_3$ are as defined above, with a bis-chloro formate of the formula (VIII)

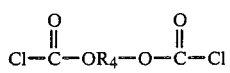

$$Cl-\overset{O}{\underset{\|}{C}}-OR_4-O-\overset{O}{\underset{\|}{C}}-Cl \quad (VIII)$$

in which $R_4$ is as defined above.

The reaction can be carried out in an inert organic solvent in the presence of an organic or inorganic base in a quantity at least equivalent to the hydrochloric acid liberated in the reaction, at a temperature between −30° and 100° C., preferably between −10° and 30° C.

In order to illustrate the present invention more clearly, the preparation of several compounds of the formula (I) is described in Examples 1 to 10 below; these examples are given by way of illustration and do not imply any restriction.

As mentioned at the outset, the compounds of the formula (I) are very effective in improving the light stability, heat stability and oxidation stability of synthetic polymers, for example high-density and low-density polyethylene, polypropylene, ethylene/propylene copolymers, ethylene/ vinyl acetate copolymers, polybutadiene, polyisoprene, polystyrene, butadiene/styrene copolymers, vinyl chloride/vinylidene chloride polymers and copolymers, polyoxymethylene, polyurethanes, saturated and unsaturated polyesters, polyamides, polycarbonates, polyacrylates, alkyd resins and epoxide resins.

The compounds of the formula (I) can be mixed with the synthetic polymers in various proportions depending on the nature of the polymer, the end use and the presence of other additives. In general, it is advantageous to employ from 0.01 to 5% by weight of the compounds of the formula (I), relative to the weight of the polymers, preferably from 0.05 to 1%.

The compounds of the formula (I) can be incorporated into the polymeric materials by various processes, such as dry blending in the form of powders, or wet mixing in the form of solutions and suspensions, or mixing in the form of a masterbatch; in these operations, the synthetic polymer can be employed in the form of powder, granules, a solution or a suspension, or in the form of a latex. The polymers stabilised with the products of the formula (I) can be used for the preparation of moulded articles, films, tapes, fibres, monofilaments, surface coatings and the like.

If desired, other additives, such as antioxidants, ultraviolet absorbers, nickel stabilisers, pigments, fillers, plasticisers, antistatic agents, flameproofing agents, lubricants, anti-corrosion agents and metal deactivators, can be added to the mixtures of the compounds of the formula (I) with the synthetic polymers.

Examples of additives which can be mixed with the compounds of the formula (I) are, in particular:

Phenolic antioxidants, for example 2,6-di-t-butyl-p-cresol, 4,4'-thio-bis-(3-methyl-6-t-butyl-phenol), 1,1,3-tris-(2-methyl-4-hydroxy-5-t-butylphenyl)-butane, octadecyl 3-(3,5-di-t-butyl-4-hydroxyphenyl)-propionate, pentaerythritol tetrakis-3-(3,5-di-t-butyl-4-hydroxyphenyl)-propionate, tris-(3,5-di-t-butyl-4-hydroxybenzyl) isocyanurate, tris-(4-t-butyl-3-hydroxy-2,6-dimethylbenzyl) isocyanurate and calcium monoethyl 3,5-di-t-butyl-4-hydroxybenzylphosphonate.

Secondary antioxidants, such as esters of thiodipropionic acid, for example di-n-dodecyl thiodipropionate and di-n-octadecyl thiodipropionate; aliphatic sulfides and disulfides, for example di-n-dodecyl sulfide, di-n-octadecyl sulfide and di-n-octadecyl disulfide; aliphatic, aromatic or aliphatic-aromatic phosphites and thiophosphites, for example tri-n-dodecyl phosphite, tris-(nonylphenyl) phosphite, tri-n-dodecyl trithiophosphite, phenyl di-n-decyl phosphite, di-n-octadecyl pentaerythritol diphosphite, tris-(2,4-di-t-butylphenyl) phosphite and tetrakis-(2,4-di-t-butylphenyl) 4,4'-biphenylenediphosphonite;

Ultraviolet absorbers, for example 2-hydroxy-4-n-octyloxybenzophenone, 2-hydroxy-4-n-dodecyloxybenzophenone, 2-(2-hydroxy-3,5-di-t-butylphenyl)-5-chlorobenzotriazole, 2-(2-hydroxy-3,5di-t-amylphenyl)-benzotriazole, 2,4-di-t-butylphenyl 3,5-di-t-butyl-4-hydroxybenzoate, hexadecyl 3,5-di-t-butyl-4-hydroxybenzoate, phenyl salicylate, p-t-butylphenyl salicylate, 2-ethoxy-2'-ethyl-oxanilide, 2-ethoxy-5-t-butyl-2'-ethyl oxanilide and 2-ethoxy-2'-ethyl-5,5'-di-t-butyl-oxanilide;

Hindered amine-type light stabilisers, for example 2,2,6,6-tetramethyl-piperidin-4-yl benzoate, bis-(2,2,6,6-tetramethyl-piperidin-4-yl) sebacate, bis-(1,2,2,6,6-pentamethyl-piperidin-4-yl) sebacate, bis-(1,2,2,6,6-pentamethyl-piperidin-4-yl) butyl-3,5-di-t-butyl-4-hydroxybenzyl-malonate, piperidinyl derivatives of triazine polymers of the type described in U.S. Pat. No. 4,086,204 and piperidine polyesters of the type described in U.S. Pat. No. 4,233,412, 2,2,4,4-tetramethyl-7-oxa-3,20-diazadispiro[5.1.11.2]heneicosan-21-one and 1,1'-ethylene-(3,3,5,5-tetramethyl-piperazinone);

Light stabilisers based on nickel, for example Ni monoethyl 3,5-di-t-butyl-4-hydroxybenzyl-phosphonate, the butylamine-Ni 2,2'-thio-bis-(4-t-octylphenolate) complex, Ni 2,2'-this-bis-(4-t-octylphenylphenolate), Ni dibutyl-dithiocarbamate, Ni 3,5-di-t-butyl-4-hydroxybenzoate and the Ni complex of 2-hydroxy-4-n-octyloxybenzophenone;

Organo-tin stabilisers, for example dibutyl-tin maleate, dibutyl-tin laurate and dioctyl-tin maleate;

Acrylic ester, for example ethyl $\alpha$-cyano-$\beta,\beta$-diphenylacrylate and methyl $\alpha$-cyano-$\beta$-methyl-4-methoxycinnamate;

Metal salts of higher fatty acids, for example calcium stearate, barium stearate, cadmium stearate, zinc stearate, lead stearate, nickel stearate, magnesium behenate, calcium behenate, barium behenate, zinc behenate, calcium laurate, cadmium laurate, zinc laurate and barium laurate;

Organic and inorganic pigments, for example Colour Index Pigment Yellow 37, Colour Index Pigment Yellow 83, Colour Index Pigment Red 144, Colour Index Pigment Red 48:3, Colour Index Pigment Blue 15, Colour Index Pigment Green 7, titanium dioxide, iron oxide and the like.

The efficiency, as stabilisers, of the products prepared according to the present invention is illustrated in Examples 11 to 13 which follow, wherein several products obtained in the preparation examples are used for stabilising polypropylene tapes and fibres and low-density polyethylene film.

EXAMPLE 1

46.8 g (0.1 mol) of N,N'-bis-(methoxycarbonyl)-N,N'-bis-(2,2,6,6-tetramethyl-piperidin-4-yl)-1,3-diaminopropane, 20.1 g (0.1 mol) of 1-(2-hydroxyethyl)-2,2,6,6-tetramethyl-piperidin-4-ol and 1 g of sodium are heated at 220°–240° C. for 4 hours under normal pressure and for 2 hours under 20 mm Hg.

The reaction mixture is cooled to ambient temperature, treated with 250 ml of xylene and filtered; the filtrate is washed with water and then evaporated to dryness.

The product obtained has a melting point of 102°–115° C. and a number average molecular weight $\overline{Mn}$ of 1900.

EXAMPLES 2–4

The following compounds of the formula (I) have been prepared by the procedure described in Example 1:

| Example | $R_1$ | $R_2$ | $R_3$ | $R_4$ | M.p. °C. | $\overline{Mn}$ |
|---|---|---|---|---|---|---|
| 2 | H | —(CH$_2$)$_6$— | 2,2,6,6-tetramethylpiperidin-4-yl (NH) | NCH$_2$CH$_2$— (tetramethylpiperidinyl) | 78–87 | 1700 |
| 3 | H | —(CH$_2$)$_6$ | 2,2,6,6-tetramethylpiperidin-4-yl (NH) | —(CH$_2$)$_6$— | 123–32 | 1700 |

-continued

| Example | R₁ | R₂ | R₃ | R₄ | M.p. °C. | $\overline{M}n$ |
|---------|----|----|----|----|----------|----|
| 4 | H | —(CH₂)₆— | 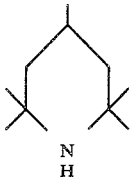 | —CH₂——CH₂— | 159–70 | 2000 |

In the present application

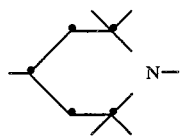

always means

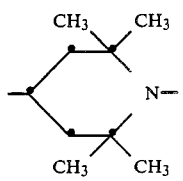

EXAMPLE 5

A solution of 21.5 g (0.1 mol) of 1,4-butanediol bis-chloroformate in 100 ml of 1,2-dichloroethane is added slowly, without exceeding 10° C., to a solution, cooled to 0° C., of 35.2 g (0.1 mol) of N,N'-bis-(2,2,6,6-tetramethyl-piperidin-4-yl)-1,3-diaminopropane in 200 ml of 1,2-dichloroethane.

After the end of the addition, the mixture is stirred for 1 hour at 0°–10° C., and a solution of 8 g of sodium hydroxide in 50 ml of water is then added, the temperature being maintained between 0° C. and 10° C.

The mixture is stirred for 2 hours, the temperature being allowed to rise to 20° C., the aqueous phase is separated off, and the organic phase is washed with water and finally evaporated to dryness.

The product obtained has a melting point of 95°–105° C. and a number average molecular weight $\overline{M}n$ of 4200.

EXAMPLES 6–10

The following compounds of the formula (I) have been prepared by the procedure described in Example 5:

| Example | R₁ | R₂ | R₃ | R₄ | M.p. °C. | $\overline{M}n$ |
|---------|----|----|----|----|----------|----|
| 6 | H | —(CH₂)₆— | 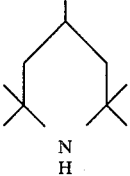 | —(CH₂)₄— | 81–94 | 2500 |
| 7 | H | —(CH₂)₂— | 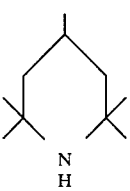 | —(CH₂)₆— | 150–165 | 3200 |
| 8 | H | —(CH₂)₃— | 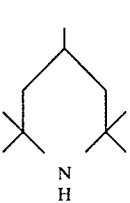 | —(CH₂)₆— | 95–102 | 4000 |

-continued

| Example | R₁ | R₂ | R₃ | R₄ | M.p. °C. | $\overline{M}n$ |
|---|---|---|---|---|---|---|
| 9 | H | —(CH₂)₆— | (tetramethylpiperidinyl, NH) | —(CH₂)₂—O(CH₂)₂— | 63–75 | 2300 |
| 10 | H | —(CH₂)₃ | (piperidinyl, H) | —(CH₂)₄ | 85–108 | 3100 |

EXAMPLE 11

Mixtures of polymer are prepared by mixing 2 g of a stabiliser indicated in Table 1, 1 g of pentaerythritol tetrakis-3-(3,5-di-t-butyl-4-hydroxyphenyl)-propionate and 1 g of calcium stearate in a powder mixture with 1,000 g of polypropylene powder of melt index 2.4 (Propathene HF 18, a product of Imperial Chemical Industries).

The mixtures obtained are extruded at a temperature of 180°–220° C., to give polymer granules, which are then converted into stretched tapes of 50 μm thickness and 2.5 mm width, under the following working conditions:
extruder temperature: 220°–240° C.
head temperature: 240° C.
stretch ratio: 1:6

The tapes thus prepared are exposed, mounted on white card, in a 65 WR model Weather-Ometer (ASTM G 27-70), with a black panel temperature of 63° C.

The residual tenacity is measured on samples, taken after various times of exposure to light, by means of a constant-speed tensometer; the exposure time in hours ($T_{50}$) needed to halve the initial tenacity is then calculated.

For comparison, polypropylene tapes prepared under the same conditions as indicated above, but without the addition of the compounds of the invention, are exposed to light.

The results are shown in Table 1:

TABLE 1

| Stabiliser | $T_{50}$ (hours) |
|---|---|
| none | 280 |
| Compound of Example 1 | 2,260 |
| Compound of Example 2 | 2,380 |
| Compound of Example 3 | 1,820 |
| Compound of Example 4 | 1,800 |
| Compound of Example 8 | 1,740 |
| Compound of Example 9 | 1,810 |

EXAMPLE 12

2.5 g of one of the stabilisers indicated in Table 2, 1 g of octadecyl 3-(3,5-di-t-butyl-4-hydroxyphenyl)-propionate, 1 g of calcium stearate and 2.5 g of titanium dioxide (KRONOS RN 57) are mixed, in a powder mixer, with 1,000 g of polypropylene powder of melt index 13 (Propathene HF 85, a product of Imperial Chemical Industries).

The mixtures are extruded at 180°–220° C., to give polymer granules which are then converted into fibres, under the following working conditions:
extruder temperature: 220°–240° C.
spinneret temperature: 240° C.
stretch ratio: 1:3.5
count: 20 deniers per fibre The fibres thus prepared are exposed, mounted on white card, in a 65 WR model Weather-Ometer with a black panel temperature of 63° C. The $T_{50}$ value is then calculated as described in the preceding example. For comparison, the data obtained with fibres prepared under the same conditions as described above, but with the addition of the compounds of the invention, are also given.

The results obtained are shown in Table 2.

TABLE 2

| Stabiliser | $T_{50}$ (hours) |
|---|---|
| none | 80 |
| Compound of Example 1 | 890 |
| Compound of Example 5 | 910 |
| Compound of Example 6 | 1,020 |
| Compound of Example 7 | 1,060 |
| Compound of Example 8 | 1,020 |

EXAMPLE 13

In each of the tests recorded in Table 3, 2 g of a compound prepared according to the present invention and 0.3 g of octadecyl 3-(3,5-di-t-butyl-4-hydroxyphenyl)-propionate (antioxidant) are intimately mixed with 1,000 g of low-density polyethylene powder of melt index 0.6 (Fertene EF 3-2000, a product of Soc. Montedison).

The mixture obtained is then extruded at a temperature of 190° C. and converted into granules, from which films of 0.2 mm thickness are produced by compression-moulding at 200° C.; the films are exposed on white card in a 65 WR Weather-Ometer (ASTM G 27-70) with a black panel temperature of 63° C. On the exposed samples, the time in hours ($T_{0.2}$) required to have an increase in the content of carbonyl groups of 0.2% at 5.85 micrometers is determined.

For comparison, a film of polymer without the addition of stabilisers prepared according to the invention is prepared and exposed to light, under the same conditions as described above.

The results obtained are shown in Table 3:

TABLE 3

| Stabiliser | $T_{0.2}$ (hours) |
|---|---|
| none | 860 |
| Compound of Example 1 | 5,170 |
| Compound of Example 2 | 4,560 |
| Compound of Example 3 | 4,470 |

What is claimed is:

1. A compound of the formula I

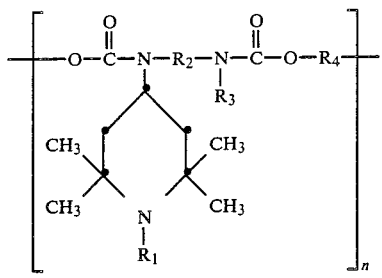

in which $R_1$ is hydrogen, O-, cyanomethyl, $C_1$-$C_{12}$-alkyl, $C_3$-$C_{12}$-alkenyl or -alkynyl, $C_7$-$C_{12}$-aralkyl, $C_1$-$C_{12}$-acyl, 2,3-epoxypropyl or

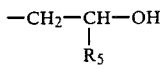

wherein $R_5$ is hydrogen, methyl, ethyl or phenyl, $R_2$ is $C_2$-$C_{12}$-alkylene, $C_4$-$C_{18}$-alkylene substituted by 1 to 2 oxygen or nitrogen atoms, $C_6$-$C_{12}$-cycloalkylene, $C_6$-$C_{12}$-Arylene or $C_8$-$C_{12}$-aralkylene, $R_3$ is hydrogen, $C_1$-$C_{18}$-alkyl, $C_5$-$C_{18}$-cycloalkyl, $C_6$-$C_{18}$-aryl, $C_7$-$C_{18}$-aralkyl or a radical of the formula (II)

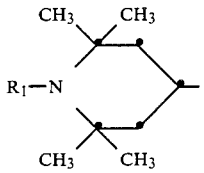

where $R_1$ is as defined above, $R_4$ is $C_2$-$C_{18}$-alkylene, $C_4$-$C_{12}$-alkylene substituted by 1 or 2 oxygen atoms, $C_6$-$C_{18}$-cycloalkylene, $C_6$-$C_{18}$-arylene, $C_8$-$C_{18}$-aralkylene or a radical of the formula (III) of (IV)

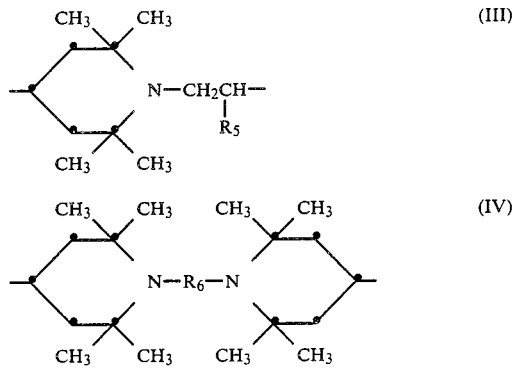

wherein $R_5$ is as defined above and $R_6$ $C_2$-$C_{12}$-alkylene, $C_4$-$C_{12}$-alkenylene or $C_8$-$C_{12}$-aralkylene, and n is a number from 2 to 100.

2. A compound of the formula (I) according to claim 1, wherein $R_1$ is hydrogen, methyl, allyl, benzyl or acetyl, $R_2$ is $C_2$-$C_{12}$-alkylene, $R_3$ is $C_1$-$C_{12}$-alkyl, $C_5$-$C_{12}$-cycloalkyl or a radical of the formula (II) where $R_1$ is as defined, $R_4$ is $C_2$-$C_{12}$-alkylene, 3-oxapentane-1,5-diyl, $C_6$-$C_{10}$-cycloalkylene, a radical of the formula (III) where $R_5$ is hydrogen, methyl or ethyl, or a radical of the formula (IV) where $R_6$ is $C_2$-$C_6$-alkylene, but-2-ene-1,4-diyl or xylylene, and n is a number from 2 to 50.

3. A compound of the formula (I) according to claim 1, wherein $R_1$ is hydrogen or methyl, $R_2$ is $C_2$-$C_6$-alkylene, $R_3$ is $C_1$-$C_8$alkyl, $C_6$-$C_9$-cycloalkyl, 2,2,6,6-tetramethyl-piperidin-4-yl or 1,2,2,6,6-pentamethyl-piperidin-4-yl, $R_4$ is $C_2$-$C_6$-alkylene, a radical of the formula (III) where $R_5$ is hydrogen or methyl, or a radical of the formula (IV) where $R_6$ is xylylene, and n is a number from 2 to 20.

4. A light-stabilised, heat-stabilised and oxidation-stabilised polymer composition comprising a synthetic polymer and one or more stabilisers of the formula (I) according to claim 1 in a quantity from 0.01 to 5% by weight relative to the weight of the synthetic polymer.

5. A composition according to claim 4, which, in addition to the novel stabiliser of the formula (I), comprises other conventional additives for synthetic polymers.

6. A composition according to claim 4, wherein the synthetic polymer is polyethylene of polypropylene.

* * * * *